(12) United States Patent
Kadota

(10) Patent No.: US 8,187,144 B2
(45) Date of Patent: May 29, 2012

(54) CLUTCH TORQUE CONTROL SYSTEM OF HYBRID ELECTRIC VEHICLE

(75) Inventor: Keiji Kadota, Chiba (JP)

(73) Assignees: Hyundai Motor Company, Seoul (KR); Kia Motors Corporation, Seoul (KR); Hyundai Kia Motor Japan R&D Center Inc., Chiba (JP)

( * ) Notice: Subject to any disclaimer, the term of this patent is extended or adjusted under 35 U.S.C. 154(b) by 766 days.

(21) Appl. No.: 12/229,634

(22) Filed: Aug. 25, 2008

(65) Prior Publication Data

US 2009/0233766 A1    Sep. 17, 2009

(30) Foreign Application Priority Data

Mar. 17, 2008   (JP) ................................. 2008-067812

(51) Int. Cl.
*B60W 10/02* (2006.01)
*B60W 10/06* (2006.01)

(52) U.S. Cl. .............................. 477/5; 477/176; 477/181

(58) Field of Classification Search .................. 477/3, 5, 477/6, 181, 906, 907; 701/67, 68; 180/65.265
See application file for complete search history.

(56) References Cited

U.S. PATENT DOCUMENTS

| | | | | |
|---|---|---|---|---|
| 4,858,131 A * | 8/1989 | Sugimura et al. | ............... | 701/68 |
| 6,342,027 B1 * | 1/2002 | Suzuki | ............................. | 477/5 |
| 7,349,785 B2 * | 3/2008 | Lee et al. | ......................... | 701/67 |
| 7,490,685 B2 * | 2/2009 | Aoki et al. | .................. | 180/65.28 |
| 7,617,896 B2 * | 11/2009 | Ogata | .......................... | 180/65.7 |
| 7,691,027 B2 * | 4/2010 | Soliman et al. | .................... | 477/5 |
| 2007/0225113 A1 * | 9/2007 | Ogata | ................................ | 477/3 |
| 2009/0143188 A1 * | 6/2009 | Soliman et al. | .................... | 477/5 |
| 2009/0156355 A1 * | 6/2009 | Oh et al. | ............................. | 477/5 |
| 2010/0000814 A1 * | 1/2010 | Katsuta et al. | ........... | 180/65.265 |

FOREIGN PATENT DOCUMENTS

| | | |
|---|---|---|
| JP | 10-068335 | 3/1998 |
| JP | 2001-132492 | 5/2001 |
| JP | 2005-218221 | 8/2005 |
| JP | 2006-151306 | 6/2006 |

* cited by examiner

*Primary Examiner* — David D Le
*Assistant Examiner* — Jude Agendia
(74) *Attorney, Agent, or Firm* — Edwards Wildman Palmer LLP; Peter F. Corless

(57) ABSTRACT

The present invention provides a clutch torque control system of a hybrid electric vehicle, which performs an engine rotational speed control in a power generation system including an engine, a motor-generator, and a clutch for controlling connection and disconnection between the engine and the motor-generator.

4 Claims, 6 Drawing Sheets

CLUTCH TORQUE CONTROL SYSTEM OF HYBRID ELECTRIC VEHICLE

CROSS-REFERENCE TO RELATED APPLICATION

This application claims under 35 U.S.C. §119(a) the benefit of Japanese Patent Application No. 2008-67812 filed Mar. 17, 2008, the entire contents of which are incorporated herein by reference.

BACKGROUND (a) Technical Field

The present invention relates to a clutch torque control system. More particularly, the present invention relates to a clutch torque control system of a hybrid electric vehicle, which performs an engine rotational speed control in a power generation system including an engine, a motor-generator, and a clutch for controlling connection and disconnection between the engine and the motor-generator.

(b) Background Art

Output power of an engine of a vehicle is transmitted to wheels through a clutch, a transmission, and a deferential gear.

During start-up of the engine or during low-speed driving where the engine rotational speed is low, an irregular rotation of the engine is directly transmitted to the wheels, thus degrading driving performance.

Japanese Patent No. 2900667 discloses a slip lock up controller, in which a clutch is controlled in a half-clutch state during start-up or during low-speed driving.

According to the above slip lock-up controller, a slip amount ($\Delta n$) may be defined by the following formula 1.

$$\Delta n = \text{clutch input rotational speed} - \text{clutch output rotational speed} \qquad \text{[Formula 1]}$$

According to Japanese Patent No. 2900667 as described above, as engine torque vibration, when the slip amount ($\Delta n$) is 0 during clutch engagement, is directly transmitted to the transmission, a driver may feel discomfort. The Japanese Patent No. 2900667 as described above does not discuss or suggest that a change in the slip amount ($\Delta n$) causes a change in friction coefficient ($\mu$) of the clutch, and that accordingly the transfer torque is changed.

The above information disclosed in this Background section is only for enhancement of understanding of the background of the invention and therefore it may contain information that does not form the prior art that is already known in this country to a person of ordinary skill in the art.

SUMMARY

As described herein, the present invention is directed to a clutch torque control system which reduces a change in friction coefficient ($\mu$) in a hybrid system comprising an engine and a motor-generator. According to preferred embodiments of the invention as described, it is possible to reduce a change in torque (T) by suitably controlling a slip amount ($\Delta n$) to become smaller during half-clutch and thus achieve smooth acceleration of the vehicle during start-up of the engine or during low-speed driving.

In a preferred embodiment, the present invention provides a clutch torque control system of a hybrid electric vehicle, the system comprising a power generation system including, but not limited to, at least one motor-generator connected to a power transmission system, a rotational speed detecting means thereof, and a suitable control means thereof; an engine, a rotation speed detecting means thereof, and a control means thereof; and a clutch for suitably performing connection and disconnection between the motor-generator and the engine, wherein, when the clutch is engaged in a half-clutch state during acceleration of the vehicle, an output torque of the engine is suitably controlled so that an engine rotational speed is determined as a small value within the range that the engine obtain a sufficient torque, and the engine rotational speed is controlled so that a minimum amplitude value of an engine rotational speed control is determined to exceed a motor-generator rotational speed.

In a preferred embodiment, the engine comprises an engine main body and at least one integrated starter-generator connected to the engine main body, and the engine rotational speed is suitably controlled by controlling either or both of an output torque of the engine main body and that of the integrated starter-generator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
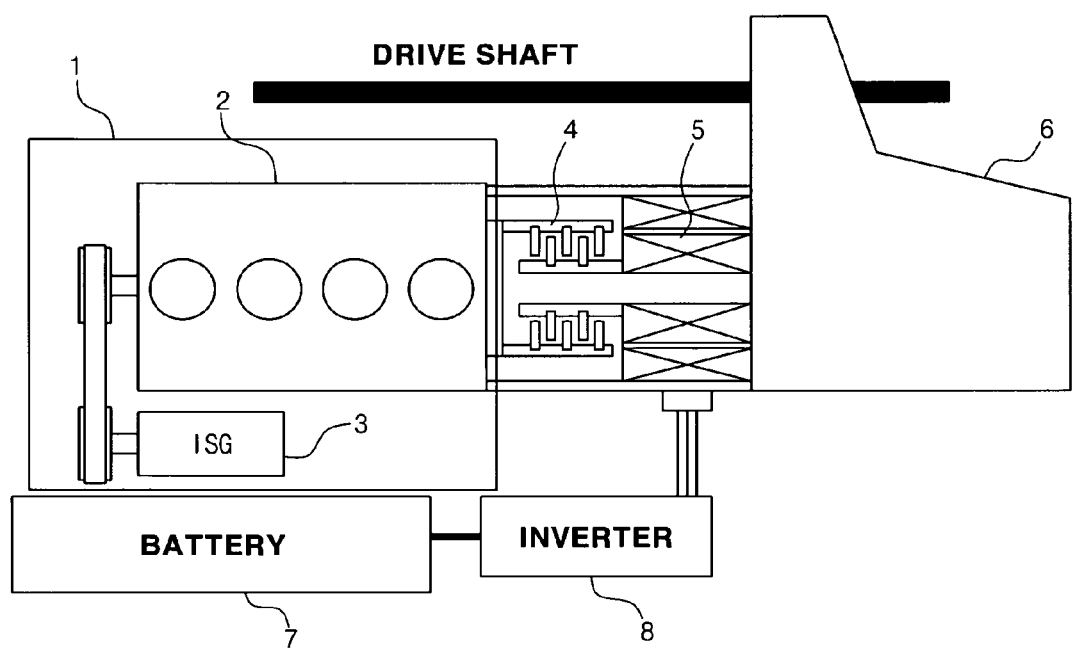
FIG. 1 is a schematic diagram showing a power transmission system for a hybrid electric vehicle in accordance with the present invention.

Reference numerals set forth in the Drawings includes reference to the following elements as further discussed below:

1: engine
2: engine main body
3: ISG
4: clutch
5: motor-generator
6: transmission
7: battery 8: inverter
9: wheel
10: engine control unit
11: engine controller
12: clutch controller
20: engine rotational speed
21: engine rotational speed detecting means
22: motor-generator rotational speed
23: motor-generator rotational speed detecting means
24: ISG-equipped engine rotational speed
30: engine start-up period
31: combustion stabilizing period
32: rotation increasing period
33: torque output period
35: clutch pressing force
36: clutch off
37: half clutch
38: full engagement
40: slip amount
41: slip limit value
42: target engine rotational speed
43: idle rotational speed
44: slip limit value
45: target engine rotational speed during slip
46: slip limit value
47: target rotational speed of ISG-equipped engine during slip It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention features a clutch torque control system of a hybrid electric vehicle, where the system comprises a power generation system comprising at least one motor-generator connected to a power transmission system, a rotational speed detecting means thereof, and a controller means thereof; an engine, a rotation speed detecting means thereof, and a controller means thereof; and a clutch for performing connection and disconnection between the motor-generator and the engine and wherein, when the clutch is engaged in a half-clutch state during acceleration of the vehicle, an output torque of the engine is controlled.

In certain embodiments, the output torque of the engine is controlled so that an engine rotational speed is determined as a small value within the range that the engine obtain a sufficient torque. In other embodiments, the engine rotational speed is controlled so that a minimum amplitude value of an engine rotational speed control is determined to exceed a motor-generator rotational speed. In other embodiments, the engine comprises an engine main body and at least one integrated starter-generator connected to the engine main body, and the engine rotational speed is controlled by controlling either or both of an output torque of the engine main body and that of the integrated starter-generator.

The invention can also include a motor vehicle comprising the clutch torque control system as described in any of the aspects herein. In preferred embodiments, the motor vehicle is a hybrid vehicle, particularly a hybrid electric vehicle.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

FIG. 1 is a schematic diagram showing a power transmission system, preferably including, but not limited to, an engine 1, an engine main body 2, an integrated starter-generator (ISG) 3, a clutch 4, a motor-generator 5, a transmission 6, a battery 7, and an inverter 8 for controlling the motor-generator 5.

Figure 2:
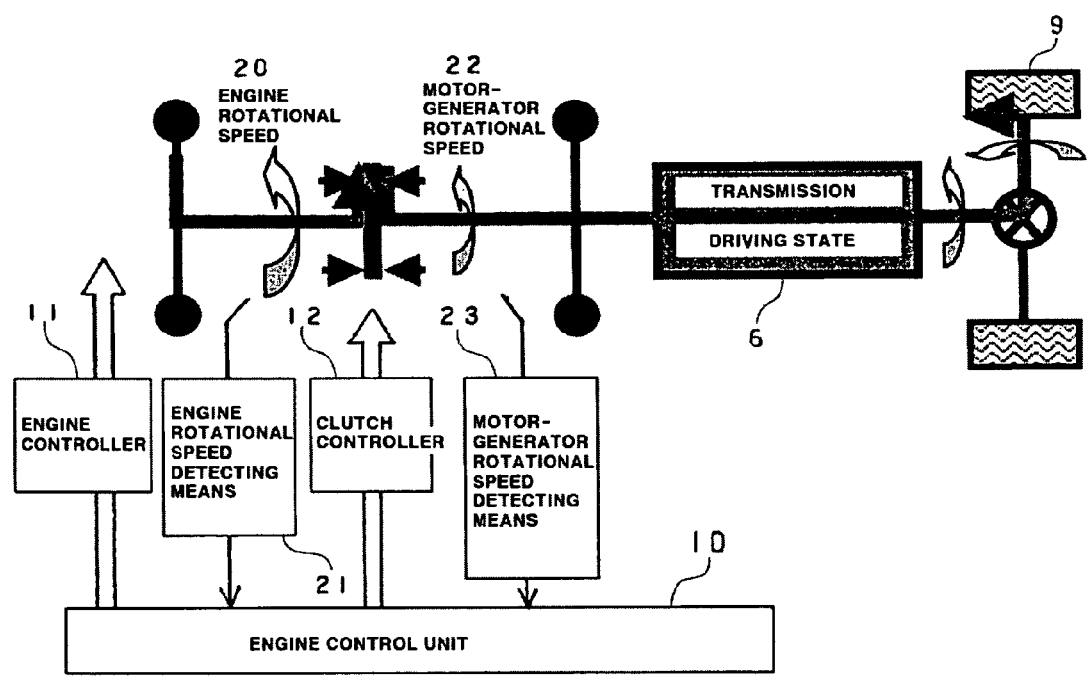
FIG. 2 is a schematic diagram showing a rotational speed control in the power transmission system by an engine control unit and rotational speed detecting means in accordance with the present invention.

FIG. 2 is an exemplary schematic diagram showing a rotational speed control by an engine control unit (ECU) 10, in which an ISG-equipped engine rotational speed 24 and a motor-generator rotational speed 22 are suitably obtained by an engine rotational speed detecting means 21 and a motor-generator rotational speed detecting means 23, an engine rotational speed 20 is suitably controlled by an engine controller 11, and suitable driving conditions during start-up of the engine or during low-speed driving are provided.

Figure 3:
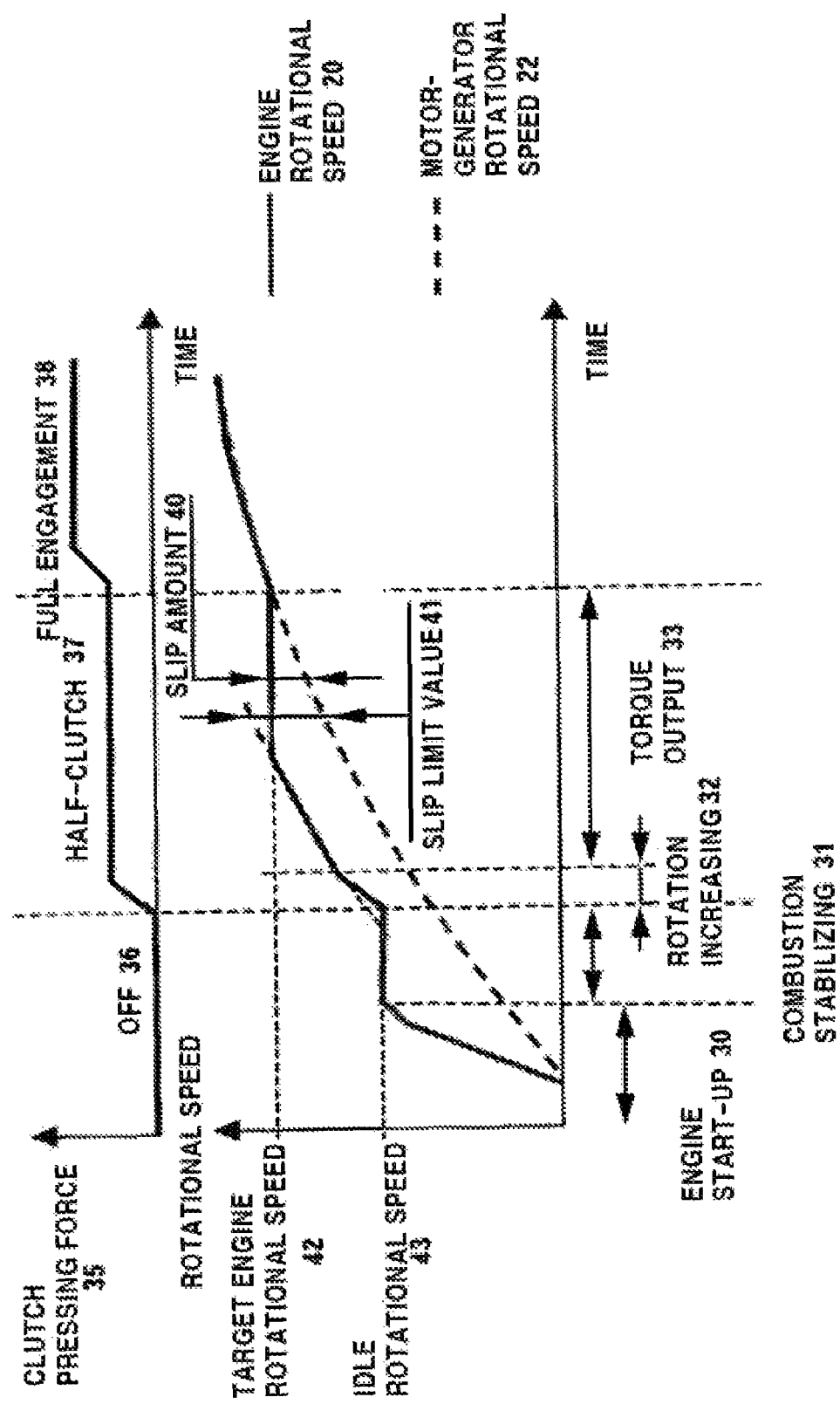
FIG. 3 is a graph showing a rotational speed control of an engine during start-up of the engine in accordance with the present invention.
Figure 4A:
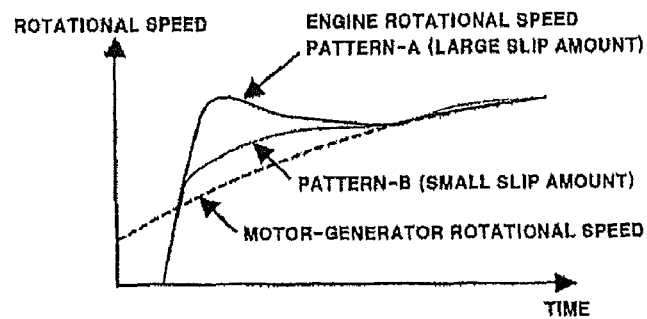
FIGS. 4A-D are a graphs showing the relationship between a friction coefficient and a slip amount.
Figure 4B:
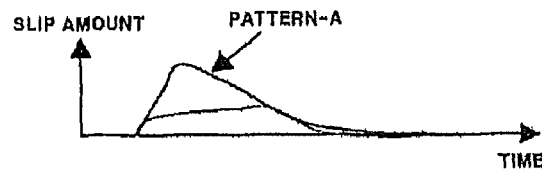
Figure 4C:
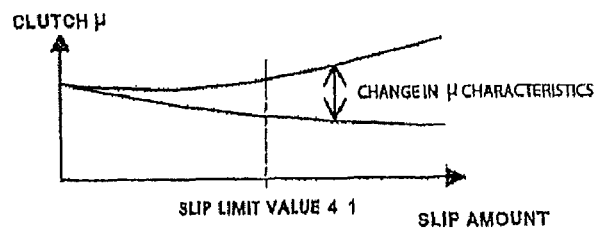
Figure 4D:
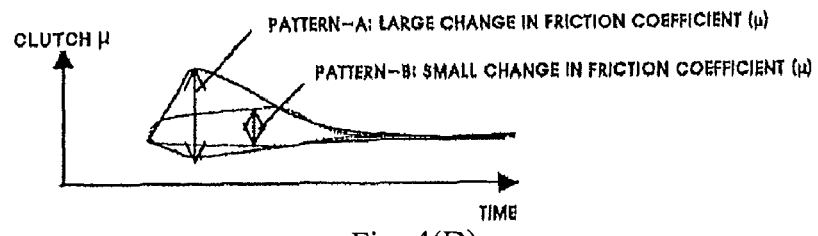

FIG. 3 is a graph showing a rotational speed control, in which a suitable target engine rotational speed 42, an idle rotational speed 43, and a slip limit value 41 are given, and the engine rotational speed 20 and the motor-generator rotational speed 22 are suitably increased during sequential operations, such as, but not limited to, an engine start-up period 30, a combustion stabilizing period 31, a rotation increasing period 32, and a torque output period 33. The upper graph of FIG. 3 shows that a clutch pressing force 35 is suitably changed in sequential order from a clutch off 36, a half-clutch 37, and a full engagement 38.

In certain embodiments, as shown by the solid line in the lower graph of FIG. 3, the engine rotational speed 20 is preferably rapidly increased upon start-up of the engine 1 and then suitably maintained at the idle rotational speed 43 during the combustion stabilizing period 31. Preferably, the operation of the vehicle during this period is suitably performed by the motor-generator 5 in accordance with the present invention, in which the motor-generator rotational speed 22 is increased from 0.

In further embodiments, upon entering the rotation increasing period 32, the half-clutch 37 is suitably initiated and the driving force of the engine 1 is applied.

In certain embodiments, the engine rotational speed 20 is preferably increased while a slip amount (Δn) 40 is limited within a slip limit value 41 and, after reaching a suitable target engine rotational speed engine 42, the engine rotational speed 20 and the motor-generator rotational speed 22 are preferably increased at the same magnitude in accordance with the full engagement 38 of the clutch 4.

FIG. 4 is a graph showing that in preferred embodiments a friction coefficient (μ) of the clutch 4 is different according to two driving patterns in the driving region of the half-clutch 37.

In exemplary embodiments, the slip amount (Δn) can be represented by the following formula 2.

$$\Delta n = \text{engine rotational speed} - \text{motor-generator rotational speed} \qquad \text{[Formula 2]}$$

In exemplary driving pattern-A, since a torque more than a predetermined value is suitably output and the engine rotational speed control is not performed during start-up of the engine 1, the slip amount (Δn) of formula 2, i.e., a difference between the engine rotational speed 20 and the motor-generator rotational speed 22 is suitably increased. In other exemplary embodiments, for example in driving pattern-B, although a torque more than a predetermined value is suitably output during start-up of the engine 1, the slip amount (Δn) is controlled so as not to exceed a predetermined slip limit value 41.

Graph (A) in FIG. 4 shows that in preferred embodiments, the engine rotational speed 20 is considerably changed in driving pattern-A compared with driving pattern-B upon start-up of the engine 1.

Graph (B) in FIG. 4 shows a relationship between the time and the slip amount (Δn) in driving patterns A and B. In exemplary embodiments, the slip amount (Δn) of driving pattern-A is suitably increased higher than that of driving pattern-B.

Graph (C) in FIG. 4 shows a relationship between the slip amount (Δn) and the clutch friction coefficient (μ).

In preferred embodiments of the invention as described herein, the friction coefficient (μ) is a function of the slip amount (Δn) as represented by the following formula 3.

$$\mu = f(\Delta n) \quad \text{[Formula 3]}$$

In further embodiments, the higher the slip amount (Δn) becomes, the higher the change in the friction coefficient (μ) is.

In driving pattern-B, since the slip amount (Δn) is preferably controlled so as not to exceed the predetermined slip limit value 41, the change in the friction coefficient (μ) is suitably limited.

Graph (D) in FIG. 4 shows the change in the friction coefficient (μ) along with the engine start-up from the relationships shown in graphs (A), (B), and (C).

In certain embodiments, according to driving pattern-A, the clutch friction coefficient (μ) is considerably increased with time, and its change is large.

In other embodiments, according to preferred driving pattern-B, since the slip amount (Δn) is suitably limited, the change in the clutch friction coefficient (μ) is small with time, and its change is small.

In preferred embodiments of the invention as described herein, a clutch transfer torque (T) is a function of the friction coefficient (μ) as represented by the following formula 4.

$$T = f(\mu) \quad \text{[Formula 4]}$$

Accordingly, in certain embodiments, since the change in the clutch friction coefficient (μ) is small during driving based on preferred driving pattern-B, it is possible to suitably reduce the change in the torque (T) transmitted from the clutch to the motor-generator during acceleration, thus providing suitable comfort to the driver.

In preferred embodiments, the present invention aims at realizing driving pattern-B.

Hereinafter, preferred embodiments of the present invention will be described.

One embodiment of the present invention is directed to a system comprising an engine 1 for a vehicle.

Figure 5:
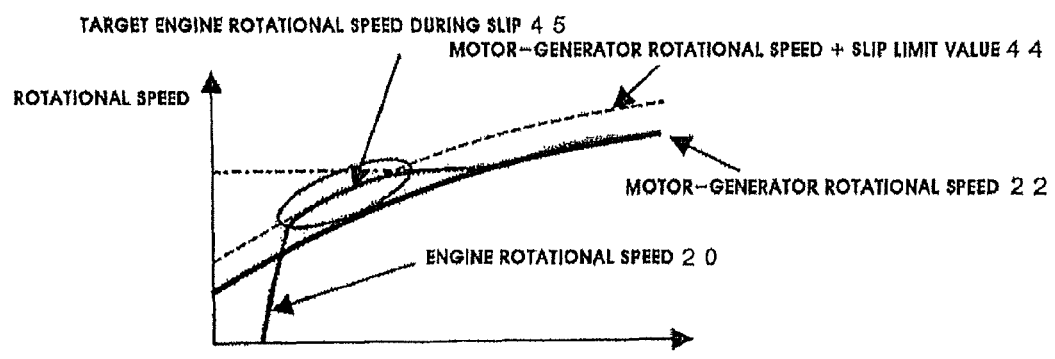
FIG. 5 is a graph showing a slip control during start-up of an engine in accordance with a first embodiment of the present invention.

In certain embodiments, the control of the rotational speed of the engine 1 during half-clutch is performed according to preferred driving pattern-B and based on the graph of FIG. 5 to which a slip limit is added.

Preferably, the engine control unit (ECU) 10 as shown in FIG. 2 performs an operation based on the engine rotational speed 20 and the motor-generator rotational speed 22 and performs an output torque control of the engine by operating the engine controller 11 so as to suitably satisfy the relationship of the following formula 5.

Slip limit value>engine rotational speed−motor-generator rotational speed>0 [Formula 5]

According to exemplary embodiments, the slip limit value 41 in this state is determined as a small value with the limited slip amount (Δn) within the range that the engine 1 can suitably obtain a sufficient torque during acceleration in the half-clutch state. Moreover, in further embodiments, since there is a ripple in the engine rotational speed 20, a minimum amplitude value of the control is determined to exceed the motor-generator rotational speed 22 so that the slip amount (Δn) in the clutch 4 does not become 0.

In certain embodiments, since the change in the friction coefficient (μ) is small during acceleration in the half-clutch state, the change in the transfer torque is suitably reduced, and it is thus possible to achieve smooth driving without acceleration failure or unexpected change in acceleration.

According to other exemplary embodiments as described herein, the invention features a system comprising an engine 1, an engine main body 2, and at least one integrated starter-generator ISG 3.

Figure 6:
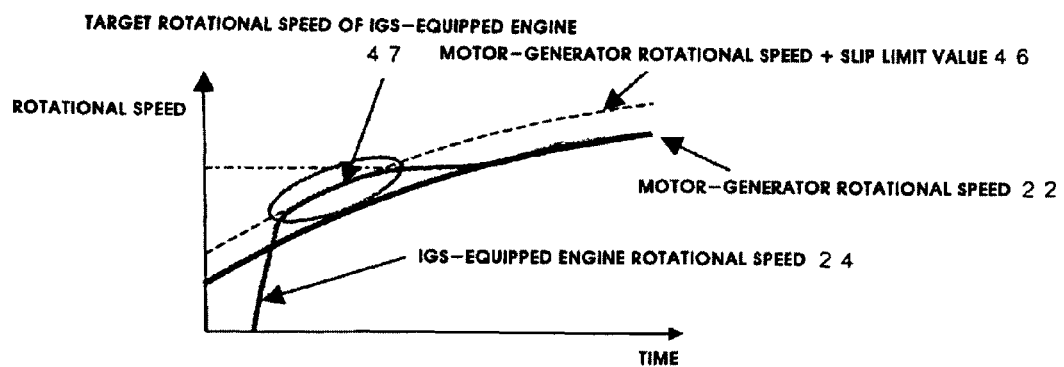
FIG. 6 is a graph showing a slip control during start-up of an engine equipped with an ISG in accordance with a second embodiment of the present invention.

Preferred exemplary embodiments are performed based on the graph of FIG. 6, in which the engine control unit 10 performs an operation, an output torque control of the engine main body 2 and the ISG 3 by operating the engine controller 11, and a control of the ISG-equipped engine rotational speed 24 so as to satisfy the relationship of the following formula 6.

Slip limit value>ISG-equipped engine rotational speed−motor-generator rotational speed>0 [Formula 6]

In preferred embodiments, the output torque control in this state is performed by suitably controlling either or both of the output of the engine main body 2 and that of the ISG 3.

The conditions for the slip limit value 46 are as described herein for the above mentioned aspects.

It is also possible to achieve smooth driving according to embodiments of the invention as described herein.

According to preferred embodiments of the invention as described herein, when the control of the engine rotational speed in the half-clutch state is preferably performed by controlling the output torque of the engine, the change in the transfer torque of the clutch is suitably reduced, although a slight deviation may occur in the engine rotational speed, and the rotational speed of the vehicle wheels is suitably smoothly increased, thus achieving smooth acceleration without causing a sense of incongruity (e.g. an unpleasant feeling) to the driver.

In further embodiments, when the driving control as described herein is performed, it is possible to prevent an excessive force from being applied to the clutch, and accordingly any clutch having inferior characteristics may be used, and a reduction in manufacturing cost of the clutch can be achieved.

According to preferred embodiments of the invention, the above driving control is not limited to the start-up of the engine. Preferably, if a control for limiting the slip amount (Δn) to the slip limit value based on formulas 5 and 6 is performed during low-speed driving, the same effect can be achieved.

As described herein, the clutch torque control system of the present invention provides the following effects.

(1) Since the engine rotational speed in the half-clutch state is suitably controlled, it is possible to suitably prevent acceleration failure or unexpected change in acceleration that causes a sense of incongruity, which is a peculiar characteristic of the hybrid vehicle, and suitably achieve smooth acceleration.

(2) It is thus possible to improve the driving performance during start-up of the engine or during low-speed driving.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A clutch torque control system of a hybrid electric vehicle, the system comprising:
 a power generation system including:
  at least one motor-generator connected to a power transmission system, a first rotational speed detecting means thereof, and a controller, the first rotational speed detecting means configured to detect the rotational speed of the at least one motor-generator;
  an engine connected to a second rotational speed detecting means, and a second controller, the second rotational speed detecting means configured to detect rotational speed of the engine; and
  a clutch for performing connection and disconnection between the motor-generator and the engine,
 wherein, when the clutch is engaged in a half-clutch state during acceleration of the vehicle, an output torque of the engine is controlled so that the rotational speed of the engine is determined as a value within a predetermined range of values, wherein controlling the engine speed to the value within the predetermined range of values provides the engine with a sufficient torque to allow for smooth acceleration, and
 wherein the engine rotational speed is controlled so that a minimum amplitude value of the engine rotational speed is determined to exceed the detected motor-generator rotational speed.

2. The system of claim 1, wherein the engine comprises an engine main body and at least one integrated starter-generator connected to the engine main body, and engine rotational speed is controlled by controlling either or both of an output torque of the engine main body and that of the at least one integrated starter-generator.

3. A clutch torque control system of a hybrid electric vehicle, the system comprising
 a power generation system comprising:
  at least one motor-generator connected to a power transmission system, a first rotational speed detecting means, and a controller, wherein the at least one motor-generator has a rotational speed associated therewith and the first rotational speed detecting means configured to detect the rotational speed of the at least one motor-generator;
  an engine having a rotational speed associated therewith, a second rotational speed detecting means, and a second controller, wherein the second rotational speed detecting means configured to detect rotational speed of the engine; and
  a clutch for performing connection and disconnection between the motor-generator and the engine; and
  wherein, when the clutch is engaged in a half-clutch state during acceleration of the vehicle, an output torque of the engine is controlled so that the rotational speed of the engine is determined as a value within a predetermined range of values, wherein controlling the engine speed to the value within the predetermined range of values provides the engine with a sufficient torque to allow for smooth acceleration, and
  wherein engine rotational speed is controlled so that a minimum amplitude value of the engine rotational speed is determined to exceed a motor-generator rotational speed.

4. The system of claim 3, wherein the engine comprises an engine main body and at least one integrated starter-generator connected to the engine main body, and the engine rotational speed is controlled by controlling either or both of an output torque of the engine main body and that of the at least one integrated starter-generator.

* * * * *